United States Patent [19]

Johannes et al.

[11] Patent Number: 5,523,537
[45] Date of Patent: Jun. 4, 1996

[54] PASSIVE LIQUIFIER

[75] Inventors: Walter Johannes, Rochester; Robert Waters, Palmyra, both of N.Y.

[73] Assignee: Eastman Kodak Company, Rochester, N.Y.

[21] Appl. No.: 815,462

[22] Filed: Dec. 31, 1991

[51] Int. Cl.[6] .................................................. F27B 14/00
[52] U.S. Cl. .......................... 219/421; 219/426; 219/521; 392/485; 264/85
[58] Field of Search ..................................... 219/421, 425, 219/426, 521; 126/343.5 A, 284; 118/602, 202, 203, 612; 137/341; 432/210, 156, 209, 13; 165/103, 35, 104; 392/485; 264/85

[56] References Cited

U.S. PATENT DOCUMENTS

| | | | |
|---|---|---|---|
| 2,253,276 | 8/1941 | Graves | 65/251 |
| 2,683,073 | 7/1954 | Pierce . | |
| 3,015,480 | 2/1962 | Nawrath et al. | 432/198 |
| 3,032,635 | 5/1962 | Kraft | 219/426 |
| 3,211,375 | 10/1965 | Prokupek | 165/103 |
| 3,302,696 | 2/1967 | Rogers | 165/103 |
| 3,395,694 | 8/1968 | Ullman | 126/343.5 A |
| 3,598,282 | 8/1971 | Phillips | 219/427 |
| 3,810,778 | 5/1974 | Wang | 430/495 |
| 3,831,908 | 8/1974 | Burst | 366/148 |
| 3,847,616 | 11/1974 | Kaneko et al. | 430/462 |
| 4,070,167 | 1/1978 | Barbee et al. | 96/175 |
| 4,395,968 | 8/1983 | Wahnschaff | 118/602 |
| 4,505,669 | 3/1985 | Rogers | 423/13 |
| 4,641,764 | 2/1987 | Faulkner, III | 222/564 |
| 4,844,927 | 7/1989 | Morris | 426/307 |
| 5,026,969 | 6/1991 | Krepler | 219/425 |

FOREIGN PATENT DOCUMENTS

| | | |
|---|---|---|
| 1501515 | 2/1978 | United Kingdom . |
| 20052730 | 1/1981 | United Kingdom . |

*Primary Examiner*—Tu Hoang
*Attorney, Agent, or Firm*—George E. Quillen

[57] ABSTRACT

A liquefying apparatus for melting solid materials has a hopper with a coiled heating element disposed therein which supports and melts the solid materials into a liquid form. The liquid is stored below the heating element in a bottom section of the hopper, and is continually adjusted to a predetermined level, in order to insure that 1) the liquid in the lower section has a substantially constant temperature distribution and 2) a skin or film is not formed on the heating element which would reduce the liquefying rate.

22 Claims, 1 Drawing Sheet

PASSIVE LIQUIFIER

BACKGROUND OF THE INVENTION

1. Field of the Invention

The present invention relates to an apparatus and method for liquefying solid materials. More particularly, the invention relates to an on-demand in-line liquefier of solid chunks of aqueous gelatin solutions.

2. Description of the Related Art

Various types of heating systems which heat solid materials up to their liquefying temperature are known. Upon reaching the liquefying temperature, the solid material is transformed into a liquid and subsequently provided to an apparatus where it is dispensed. Examples of such liquefying systems are U.S. Pat. No. 4,641,764 and U.S. Pat. No. 4,505,669, which are both concerned with heating and liquefying high viscosity hot-melt material, such as thermoplastics, particularly sealants and adhesives. However, in each of these systems, the liquefied material is immediately drawn off and used. That is, when a hot-melt adhesive is produced, it is typically pumped to an applicator and immediately applied to the items which are to be bonded. Accordingly, neither of these systems is concerned with the temporary storage of the liquefied material and the requirements of thermal maintenance associated therewith.

Moreover, as the solid material melts in each of the aforementioned systems, there is a tendency for the liquefied material to foam up around the heating elements due to the entrained air contained in the liquefied material. This foaming material often causes a "skin" or "film" to form on the heating elements which continues to build up and results in a decrease in heat transfer and a corresponding decrease in the liquefying rate. Ultimately, the decrease in heat transfer can be so large that liquefaction of the solid material becomes impossible. The changing liquefying rate is unacceptable for continuous operations where the liquefied material is being subsequently mixed proportionally and in-line with other materials. This is particularly true in the photographic industry where solid chunks of aqueous gelatin solutions are melted and automatically fed in-line to mix with other chemical compositions to produce high quality photographic products which are chemically consistent from batch to batch.

An additional problem with conventional liquefying apparatus concerns the design of the heating elements. Often, it is the case that the spacing between the heating elements is too small. When the solid material melts, puddles of liquefied material are created at certain locations on the heating elements. These puddles will foam up on the heating element as discussed above, continually reducing the liquefying rate until eventually liquefaction is impossible. On the other hand, if the spacing between the heating elements is too large, solid chunks of material will pass through the heating elements without being liquefied.

U.S. Pat. No. 3,395,694 discloses another example of an adhesive heating apparatus. However, in this apparatus, while the liquefied adhesive is temporarily stored in a sump, a separate heating system is required to maintain the temperature distribution within the sump. This additional heating system makes the apparatus complex and costly.

Still another problem with conventional liquefying systems is exemplified in United Kingdom Patent No. 1,501,515 which discloses a process and apparatus for the production of photographic materials. In the melting zone of the disclosed apparatus, the temperature of a melting grid is controlled by introducing saturated steam into the grid or by preventing saturated steam from entering the grid. However, in this apparatus the temperature of the saturated steam in the grid is allowed to vary. Thus, when saturated steam is required in the melting grid to perform the melting operation, there can be a delay in the melting process associated with the time between the initial entry of saturated steam into the grid until the required melting temperature of the steam within the grid is met. This delay makes it difficult to control the rate of the liquefaction process.

Thus, there has been a need for a passive liquefier which can be used in the photographic industry for liquefying solid chunks of aqueous solution in a simple and efficient manner, such that the liquefaction rate will be uniform, and the temperature distribution of the liquefied gelatin solution that is temporarily stored in a reservoir can be uniformly maintained in a simple and cost effective manner. Additionally, there has been a need for a passive liquefier which ensures that the heating medium provided to a heating element is provided at a substantially constant pressure and temperature to preclude any delay in initiating the melting process. Moreover, it is desirable to provide a method for accomplishing the efficient liquefaction of solid materials in a simple manner.

SUMMARY OF THE INVENTION

The above needs have been satisfied by providing a liquefying apparatus having a hopper which includes an upper and a lower section. The upper section is adapted to receive a meltable solid material and has a coiled tube disposed therein. The coiled tube supports, melts, and passes the melted solid material therethrough such that the liquefied product is stored in the lower section of the hopper and subsequently drawn off. A hot fluid reservoir is provided with a means for feeding the hot fluid out of the hot fluid reservoir. A bypass is also provided which communicates with the feeding means and allows hot fluid to flow through the coiled tube and back into the reservoir when the level of liquid in the lower section is below a predetermined level thereby raising the liquid in the lower level to the predetermined level. When the liquid level in the lower section is above the predetermined level, the bypass prevents the hot fluid from flowing through the coiled tube and allows the hot fluid to recirculate back into the reservoir thereby allowing the liquid level to fall to the predetermined level at times when a removing means is removing the liquid. The predetermined level is below the heating element such that an air space exists between the heating element and the predetermined liquid level. Additionally, as the liquefying apparatus continually adjusts the liquid in the lower section to the predetermined level, the temperature distribution of the liquid in the lower section remains substantially constant for a given output rate of the liquid from the apparatus.

The above needs have also been satisfied by providing a method for liquefying meltable solid materials including feeding meltable solid materials into a hopper, supporting the solid materials on a coiled tube, filling a first reservoir with hot fluid, heating the solid materials such that the solid materials are transformed into a liquid, passing the liquid through an air space, collecting the liquid in a second reservoir, feeding the hot fluid through the coiled tube when the liquid level is less than a predetermined level to raise the level of the liquid in the second reservoir to the predetermined level, preventing the hot fluid from entering the coiled tube when the liquid level is greater than the predetermined level thereby allowing the liquid level to fall to the predetermined level at times when fluid is being removed from the second reservoir, recirculating the hot fluid into the second reservoir, and maintaining a substantially constant liquid level in the second reservoir.

BRIEF DESCRIPTION OF THE DRAWINGS

Other objects, features and advantages of the present invention will become apparent from the following detailed description and accompanying drawings wherein.

DETAILED DESCRIPTION OF THE PREFERRED EMBODIMENTS

Figure 1:
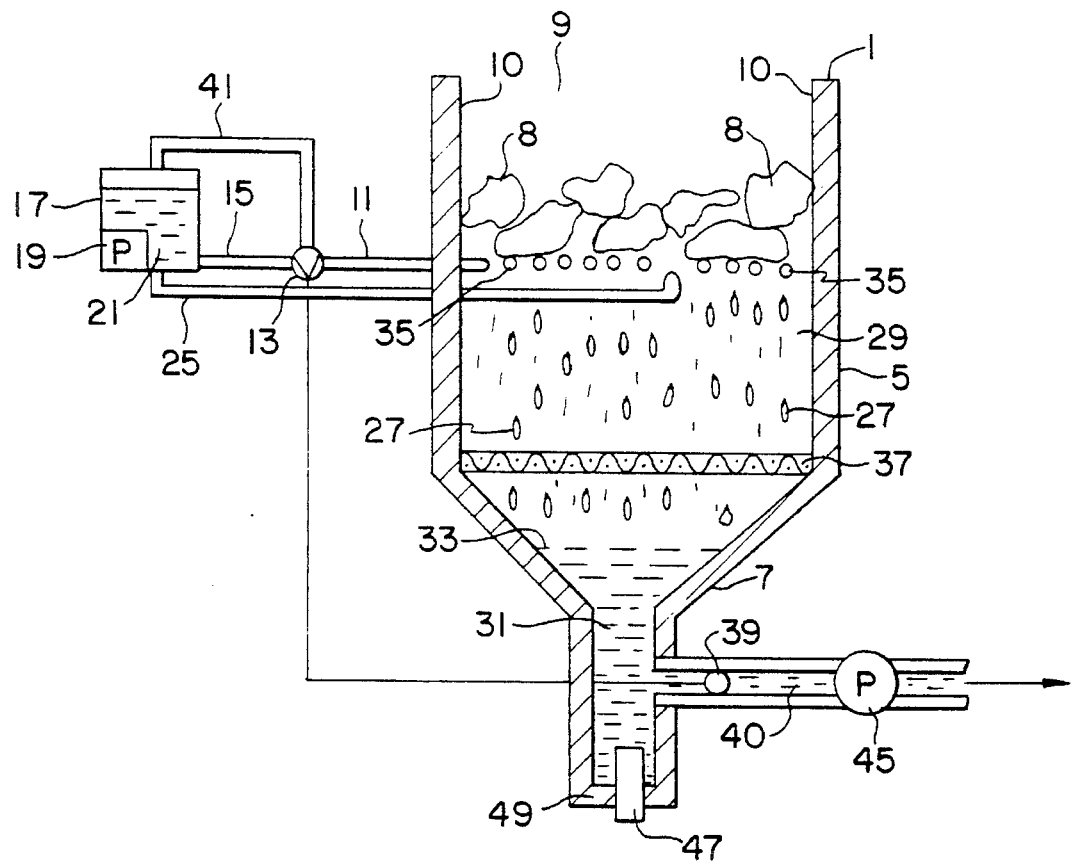
FIG. 1 is a vertical sectional view of the inventive passive liquefier.
Figure 2:
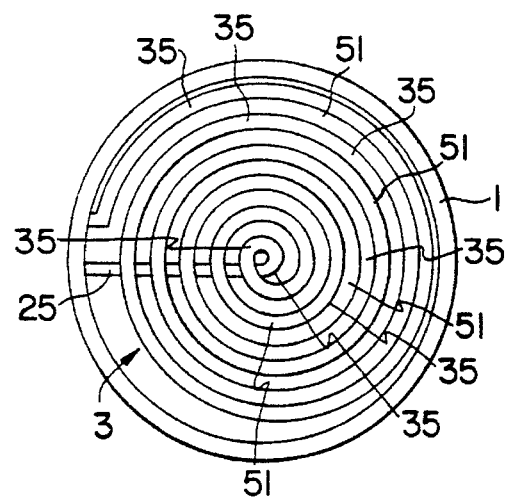
FIG. 2 is a top plan view of FIG. 1 showing only the coil as it is disposed in the hopper.

Referring to FIGS. 1 and 2, a passive liquefier is shown as including a hopper 1 having a coiled heating tube 3 which is disposed therein and connected to the hopper 1 in a conventional manner. Hopper 1 is generally divided into an upper section 5 in which the tube 3 is disposed, and a lower section 7. The tube 3 supports solid materials 8, such as solid chunks of aqueous gelatin solution, which are fed into the hopper 1 via opening 9. The solid materials rest on the tube 3 until they are heated by the tube 3 and transformed into a liquid state. Additionally upper section 5 has straight vertical walls 10 which prevent the solid chunks of aqueous gelatin from adhering to the wall surface which often occurs when the walls of the hopper are in a slanted configuration.

Tube 3 is connected via inlet pipe 11, valve 13 (shown schematically), and pipe 15 to a hot fluid reservoir 17. Within the hot fluid reservoir 17 is a pumping device 19 (shown schematically), which forces a hot fluid 21, such as water, from the hot fluid reservoir 17 so that it flows through pipe 15, valve 13, inlet pipe 11, tube 3, and back to the hot fluid reservoir 17 through outlet pipe 25. As the hot fluid 21 flows through tube 3, heat is transferred to the solid materials 8 such that their melting temperature is reached and the solid materials are transformed into a liquid state.

The hot fluid 21 is supplied to the reservoir 17 from an external source (not shown), with the specific temperature of the hot fluid being dependent upon the melting temperature of the solid materials.

The liquefied gelatin solution forms drops 27 which, due to gravity, fall from the tube 3 through an air space 29, and are collected in lower section 7 of hopper 1, thereby forming a reservoir 31 of liquefied gelatin solution. The reservoir 31 is maintained at a predetermined level 33 as will be described later. The air space 29 is defined between the predetermined level 33 and the bottom of the individual coil turns 35. Air space 29 allows the liquefied gelatin solution to run off of the tube 3 carrying away with it any entrained air. If the coil were submerged, the foaming liquid material would "skin" or form a film on the tube 3 surface reducing the heat transfer between tube 3 and solid material 8 which correspondingly would reduce the liquefying rate. Ultimately, if sufficient "skin" were developed, the heat transfer would be reduced to a point where liquefaction could not occur. The presence of the air space prevents the forming of the skin on the tube 3 and ensures a uniform liquefaction rate.

Disposed within the hopper 1, in the air space 27, is a screen 37 which collects any solid chunks of gelatin solution or any foreign objects entering the hopper 1 which might pass through the coil 3. The screen 37 is removable such that during periodic maintenance it can be removed and cleaned.

An in-line pressure sensor 39, such as Model Number WC EPR-HC-5, sold by Paper Machine Components, is located in outlet pipe 40 and is used to detect the hydrostatic head of the liquid in the reservoir which is indicative of the actual level of liquid in the reservoir 31. When the reservoir level falls below the aforementioned predetermined level 33, the sensor 39 sends a signal to valve 13 such that valve 13 allows the hot fluid 21 to pass therethrough and into tube 3, thereby melting solid material 8. However, when the reservoir level rises above the predetermined level 33, the sensor 39 sends a signal to the valve 13 whereby the valve 13 closes the passage to inlet pipe 11 and opens the passage to recirculation pipe 41, which allows the hot fluid 21 to be recirculated back into reservoir 17 without passing through tube 3, and prevents the continued melting of the solid material 8. Therefore, the level of the liquid in the reservoir is raised and lowered through the operation of the sensor 39 and the valve 13.

The recirculation of hot fluid 21 back into reservoir 17 serves a very important purpose in that when valve 13 moves in response to sensor 39 to prevent the flow of hot fluid 21 into inlet pipe 11 and allows the flow of the hot fluid 21 into recirculation pipe 41, the overall system of hot fluid flow does not experience a change in back pressure. Additionally, as the hot fluid 21 from the source (not shown) enters the reservoir 17, it rises to a certain level at which point the hot fluid is removed from the reservoir 17 via an overflow outlet (not shown) at the same rate as the input flow from the hot fluid source. Therefore, since the hot fluid input and output of the reservoir 17 are equal, and since there is no noticeable change in back pressure when the hot fluid is prevented from entering into tube 3 and flows into recirculation pipe 41, the temperature distribution in the reservoir 17 remains substantially uniform regardless of the positioning of valve 13. Accordingly, when the sensor 39 indicates that valve 13 should move into a position whereby hot fluid does not flow into recirculation pipe 41, but flows into tube 3, the temperature of the hot fluid 21 supplied to tube 3 will be at the required temperature value for immediate melting of the chunks of aqueous gelatin solution. If this were not the case, and the temperature distribution of the hot fluid in the reservoir were not controlled, the temperature of the hot fluid 21 being supplied to tube 3 could be less than the required melting temperature which would result in a delay in initiating the liquefying process until the required melting temperature was reached. Thus, in the embodiment described, the hot fluid is constantly being circulated at the required melting temperature and pressure without requiring additional heating elements in the reservoir 17.

The outlet pipe 40 extends from lower section 7 of hopper 1 and is in communication with a motor or pump 45 which regulates the removal of the liquefied gelatin solution from the liquid reservoir 31. However, it is important that the temperature of the removed liquid be substantially constant to ensure that a uniform liquefied product is produced. Thus, while the pump 45 removes the liquefied gelatin solution, the sensor 39 ensures that the level of the liquid in the reservoir is continually adjusted to the predetermined level 33 such that the temperature distribution in the reservoir 31 will remain substantially constant for a fixed liquid removal rate. That is, the reservoir fill rate is adjusted such that the liquid input and output rates are essentially the same, and therefore the temperature distribution of the liquid in the reservoir at any point in time will be substantially the same. This feature allows the temperature distribution of the liquid in the reservoir to remain substantially constant without requiring additional heating elements therein.

Moreover, because the liquid input rate and output rate of the reservoir 31 are essentially the same, the residence time of a given body of liquid within the reservoir at any point in time will be substantially the same as the residence time of a given body of liquid at a second point in time, for a fixed liquid removal rate. Thus, the residence time of the liquid in the lower section will be substantially uniform for a fixed removal rate.

A conventional ultrasonic: debubbler 47 such as the one described in U.S. Pat. No. 4,070,167, which is hereby incorporated by reference, is conventionally mounted in the bottom wall 49 of lower section 7. Debubbler 47 is located below the predetermined level 33 of the liquid and through the cavitation in the liquid reservoir 31 caused by the vibration of the debubbler horn (not shown), dissolved and entrained air or other gas becomes disengaged from and rises to the surface of the liquid gelatin solution.

As previously discussed, the spacing 51 between the coil turns 35 is important for ensuring a uniform liquefying rate. If the spacing 51 is too large, the solid chunks 8 can fall through the spacings 51 creating a non-uniform liquefaction rate. If the spacing 51 is too small, puddles will form on the coils 35 which results in the aforementioned "skinning" of the coils. Accordingly, it has been found spacing 51 between the coil turns within the range of 1.3 mm to 1.9 mm produces excellent results with a preferred spacing of 1/16 (1.59 mm) of an inch.

Additionally, while the coiled tube 3 and the hot fluid 21 passing therethrough form a heating element, it is possible to replace those elements with other heating elements such as one that is electrically heated. Moreover, a level sensor could be used instead on the in-line pressure sensor 39 and reservoir 17 could contain a heating element therein.

It is to be understood that the foregoing detailed description, while indicating preferred embodiments of the present invention, are given by way of illustration and not limitation. Many changes and modifications within the scope of the present invention may be made without departing from the spirit thereof, and the invention includes all such modifications.

What is claimed is:

1. A liquefying apparatus comprising:
    a hopper having an upper section for receiving a meltable solid material, and a lower section for storing liquid at a predetermined level;
    a coiled tube disposed in said upper section for supporting and melting said meltable solid material thereby transforming said meltable solid material into the liquid, said predetermined level and said coiled tube defining an airspace therebetween;
    a reservoir containing hot fluid therein;
    means for removing the liquid in said lower section;
    means for feeding the hot fluid out of said reservoir;
    bypass means, in communication with said feeding means, for allowing the hot fluid to flow through said coiled tube and back into said fluid reservoir when the liquid level in said lower section is less than said predetermined level such that the liquid level is raised to said predetermined level, and for preventing the hot fluid from flowing through said coiled tube while allowing the hot fluid to be recirculated into said hot fluid reservoir when the liquid level in said lower section is greater than said predetermined level, thereby allowing the liquid level to fall to said predetermined level at times when said removing means is removing the liquid;
    whereby the temperature distribution of the hot fluid in said reservoir and the temperature distribution of the liquid in said lower section remain substantially constant for a given liquid removal rate.

2. A liquefying apparatus according to claim 1, further comprising a sensor which detects the level of the liquid in said lower section, and wherein said bypass means includes a valve, said valve being operatively connected to said sensor such that said valve moves to a first position to prevent said hot fluid from flowing through said coiled tube when said sensor detects that the level of the liquid in said lower section is greater than said predetermined level and opens to a second position to allow said hot fluid to flow through said coiled tube when said sensor detects that the level of the liquid in said lower section is less than said predetermined level.

3. A liquefying apparatus according to claim 2, wherein said sensor is an in-line pressure sensor.

4. A liquefying apparatus according to claim 3, further comprising a debubbler disposed in said lower section.

5. A liquefying apparatus according to claim 4, wherein the spacing between turns of said coiled tube is approximately 1/16".

6. A liquefying apparatus according to claim 5, further comprising a screen disposed in said air space.

7. A method for melting solid materials, comprising the steps of:
    (A) feeding meltable solid materials into a hopper;
    (B) supporting said solid materials on a coiled tube;
    (C) filling a first reservoir with hot fluid;
    (D) heating said solid materials such that said solid materials are transformed into a liquid;
    (E) passing said liquid through an air space;
    (F) collecting said liquid in a second reservoir;
    (G) feeding the hot fluid through said coiled tube when the liquid level in said second reservoir is less than a predetermined level thereby raising the level of the liquid to said predetermined level;
    (H) preventing said hot fluid from passing through said coiled tube when the liquid level in said second reservoir is greater than said predetermined level thereby allowing the liquid level to fall to said predetermined level at times when the liquid is being removed from said second reservoir;
    (I) recirculating said hot fluid into said first reservoir;
    (J) maintaining a substantially constant liquid level in said lower section.

8. A method according to claim 7, further comprising the step of
    sensing the level of said liquid in said reservoir.

9. A method according to claim 7, wherein step A includes the step of supporting said solid materials on a coiled tube having turns spaced approximately 1/16" apart.

10. A liquefying apparatus comprising:
    a hopper having an upper section for receiving solid chunks of aqueous gelatin solution, and a lower section for storing liquid at a predetermined level;
    a coiled heating element having a plurality of turns spaced approximately 1/16" apart and being disposed in said upper section, said coiled heating element supporting said solid chunks of aqueous gelatin solution;
    means for heating said coiled heating element such that said solid chunks of aqueous gelatin solution are transformed into the liquid;

means for raising the liquid level in said lower section to said predetermined level when the liquid level is below said predetermined level;

means for lowering the liquid level in said lower section when the liquid level is above said predetermined level to insure that the liquid in said lower section has a substantially constant level and a uniform residence time, said lowering means including means for removing the liquid in said lower section.

11. A liquefying apparatus according to claim 10, wherein an air space is defined between said predetermined liquid level and said coiled heating element.

12. A liquefying apparatus according to claim 11, wherein said coiled heating element is an electrical heating element.

13. A liquefying apparatus according to claim 10, wherein said coiled heating element is a coiled tube and said heating means includes means for feeding hot fluid through said coiled tube.

14. A liquefying apparatus according to claim 13, wherein said raising and lowering means includes a valve which is connected to said feeding means and a sensor which detects the level of the liquid in said lower section, said valve being operatively connected to said sensor such that when said sensor detects that said predetermined liquid level is exceeded said valve closes to prevent said hot fluid from entering said coiled tube, and when said sensor detects that the level of the liquid in said lower section is below said predetermined liquid level said valve is opened to permit the flow of said hot fluid into said coiled tube.

15. A liquefying apparatus according to claim 14, further comprising a debubbler which is disposed in said lower section.

16. A liquefying apparatus according to claim 15, further comprising a screen disposed in said air space.

17. A liquefying apparatus according to claim 1, wherein the coiled heating element is disposed above the predetermined level in the lower section.

18. A method of melting solid materials according to claim 7, wherein the solid material is supported by the coiled tube above the predetermined level in the second reservoir.

19. A liquefying apparatus according to claim 10, wherein the coiled heating element is disposed above the predetermined level in the lower section.

20. A liquefying apparatus according to claim 4, wherein the spacing between turns of said coiled tube ranges from 1.3 mm to 1.9 mm.

21. A method according to claim 7, wherein step A includes the step of supporting said solid materials on a coiled tube having turns spaced apart by an amount ranging from 1.3 mm to 1.9 mm.

22. A liquefying apparatus according to claim 10, wherein said turns are spaced 1.59 mm apart.

* * * * *